United States Patent [19]

Männl et al.

[11] Patent Number: 5,433,486
[45] Date of Patent: Jul. 18, 1995

[54] PIPE CONNECTION FOR FLUE-GAS PIPES

[75] Inventors: Reinhard Männl, Mitterteich; Herbert Jung, Floss, both of Germany

[73] Assignee: Schott-Rohrglas GmbH, Bayreuth, Germany

[21] Appl. No.: 60,644

[22] Filed: May 13, 1993

[30] Foreign Application Priority Data

May 29, 1992 [DE] Germany ............ 42 17 671.912

[51] Int. Cl.6 .............................................. F16L 13/04
[52] U.S. Cl. ................................. 285/114; 285/294; 285/911; 285/915; 285/906
[58] Field of Search ............... 285/114, 911, 915, 284, 285/294, 297, 295, 292, 15, 906

[56] References Cited

U.S. PATENT DOCUMENTS

| | | | |
|---|---|---|---|
| 1,290,205 | 1/1919 | Howell | 285/297 X |
| 1,352,571 | 9/1920 | Wyatt . | |
| 1,414,800 | 5/1922 | Babb . | |
| 1,462,077 | 7/1923 | Weston | 285/284 |
| 1,463,692 | 7/1923 | Hail . | |
| 1,510,483 | 10/1924 | Lang . | |
| 1,960,249 | 5/1934 | Mano . | |
| 2,180,695 | 11/1939 | Rembert | 285/383 X |
| 2,302,244 | 11/1942 | Morrell | 285/114 |
| 2,310,122 | 2/1943 | Scott | 29/88.2 |
| 2,322,587 | 6/1943 | Payne . | |
| 2,354,350 | 7/1944 | Schuetz | 285/911 X |
| 3,331,621 | 7/1967 | Bagnulo | 285/284 X |
| 3,884,510 | 5/1975 | Bram | 285/284 X |
| 3,923,311 | 12/1975 | Tashlick | 285/284 X |
| 4,226,444 | 10/1980 | Bunyan | 285/294 X |
| 4,732,412 | 3/1988 | Van Der Linden et al. | 285/294 X |
| 4,913,472 | 4/1990 | Rao | 285/911 X |
| 5,118,139 | 6/1992 | Lott . | |

FOREIGN PATENT DOCUMENTS

| | | | |
|---|---|---|---|
| 347701 | 12/1989 | European Pat. Off. | 285/911 |
| 1078580 | 11/1954 | France | 285/297 |
| 724560 | 8/1942 | Germany . | |
| 1976874 | 1/1968 | Germany . | |
| 2600621 | 1/1978 | Germany . | |
| 242857 | 2/1987 | Germany | 285/911 |
| 3821019 | 7/1991 | Germany . | |

Primary Examiner—Dave W. Arola
Attorney, Agent, or Firm—Michael D. Bednarek; Marks & Murase

[57] ABSTRACT

The invention refers to a process and an arrangement to connect and seal tubes (2, 4) made of glass, metal or ceramic materials, that are joined to form flue-gas pipes. The sealing system according to the invention is distinguished by the fact that it can be used for exhaust gas pipes as well as for diminished cross-sections for chimneys, for example, since the sealing material is used in such a way that the overlapping pipes (2, 4) are connected in gas-tight manner even in the case of varying pressure conditions, and that the sealing material (8) is sufficiently resistant to acid, water and temperature to be used in the removal of hot, acid gases. In a preferred form of construction, the pipes (2, 4) are fixed together before applying the anorganic sealing material (8). The pipes are either fixed by punctually applied, quick-setting adhesive (6) or secured together by a pipe clamp (14) attached at the circumference of the pipes.

26 Claims, 4 Drawing Sheets

PIPE CONNECTION FOR FLUE-GAS PIPES

FIELD OF THE INVENTION

The present invention refers to a pipe connection and a process to produce a pipe connection for flue-gas pipes, in which an end, formed as a coupling sleeve if necessary, of a first pipe overlaps, forming a gap with a smooth end of a second pipe.

BACKGROUND OF THE INVENTION

The term flue-gas pipe is used hereinafter to refer to exhaust gas pipes to carry off gas by overpressure as well as gas pipes to carry off hot and, under certain circumstances, acid exhaust gases through thermal suction. The latter gas pipes are typically found as chimney arrangements, and since the introduction of modern low temperature, cyrogenic and/or condensing value boilers, also as flue-gas pipes, known as diminished cross-section, subsequently installed in existing chimney arrangements.

Exhaust gas pipes and diminished cross-sections for chimneys, known as chimney pipe systems, are produced from pipes sealed together. Ceramic materials, dead-burned fireclay, and glass, but also metal materials, preferably stainless steel, are used as materials for these pipes.

Although identical tubes are used for both types of pipe, exhaust gas pipes and chimney pipes, there is thus far no uniform piping and sealing system for exhaust gas pipes and chimney pipes, in particular diminished cross-sections. This is due to the fact that different demands are made on the sealing of these pipes.

Sealing for exhaust gas pipes must guarantee that the exhaust gas released with overpressure cannot escape at the pipe joints and that any condensing humidity cannot escape. Sealing for chimney arrangements, on the other hand, are subjected to stress high exhaust gas temperatures and highly acid condensates.

In the case of exhaust gas pipes, for example, stainless steel pipe sections are connected together by silicon-rubber seals. These silicon-rubber seals may well provide adequate tightness for changing pressure conditions, but they have only a limited chemical and temperature resistance. Stainless steel pipe sections used in chimney arrangements, on the other hand, are mounted by simple plug-in connections.

Ceramic pipes, and pipes made of dead-burned fireclay, are also sealed with silicon seals, in this case as silicon sleeves, for gas pipes. Glazed ceramics are usually used in exhaust gas pipes. Due to the inadequate acid and heat resistance of silicon sleeves, the same pipe sections are designed, when used in chimney arrangements, as pipes with groove and tongue that are connected with acid-resistant putty. However, this type of connection by groove, tongue and putty is not tight enough to guarantee that in the case of changing pressure conditions in exhaust gas pipes, for example, that the exhaust gas will not squeeze out at the pipe joints.

Pipes of glass, when used for exhaust gas pipes, are also joined together with silicon-rubber seals. Chimney arrangements are, however, sealed more expensively, for example according to the process described in German Patent 38 21 019: A mineral spacer ring is used between the glass pipes at the pipe joint, the pipe joint is wound on the outside with a mineral fiber strip fixed with anorganic adhesive, and the closing connection of the two pipes is made by a stainless-steel clamp fitting. This connection is also not sufficiently gas-tight for exhaust gas pipe use.

The different demands on sealing systems for use in exhaust gas or chimney arrangements are clearly shown in the requirements compiled by the Institute for Bautechnik (IfBt) in Berlin. Sealing systems for exhaust gas pipes must be able to withstand a pressure change from −1,000 mm WS to +40 mm WS. Chimney arrangements, on the other hand, must be able to withstand flue-gas temperatures of 40°–500° C.

In addition, seals for chimney arrangements, as explained above, must be sufficiently acid-resistant not to be decomposed by highly acid condensates that, among others, are given off by modern home heating systems such as low temperature, cyrogenic and/or condensing value boilers.

As is shown by the preceding description, a specific seal is required depending on the use of the pipes. This multiplicity requires not only great production, distribution and storage expense, but installation errors and thereby dangerous malfunctions of the pipe system can also occur under certain circumstances.

Numerous pipe connections to connect and seal two pipes are known from the state of the art; for example, from U.S. Pat. No. 2,302,244. Other papers describe the centering of two overlapping pipe ends, thus providing a uniform, annular gap to insert the sealing mass. Such centering arrangements are, for example, the subject of U.S. Pat. No. 2,310,122, German DE-GM 19 76 874 and German DE-AS 26 00 621. A disadvantage of these arrangements is the fact that the pipe ends to be connected cannot be moved until the sealing mass has completely hardened, if tightness or resistance of the connection is to be guaranteed.

SUMMARY OF THE PRESENT INVENTION

It is thus the task of the invention to create a process and an arrangement for a pipe connection that prevents slipping or detachment of the sealing mass and, in general, a disturbance of the setting of the sealing mass if the pipes to be joined, have to be moved before hardening of the sealing mass.

The pipe connection according to the invention is arranged inside or outside the pipe ends in the area of the longitudinal extension of the gap created when an end, formed as a coupling sleeve if necessary, of a first pipe is inserted into a smooth end of a second pipe. The gap extends with a certain enlargement in axial direction annularly around the circumference of the second pipe. An anorganic sealing mass is inserted into this gap throughout the annular extent of the gap.

The sealing mass does not have to completely fill the gap in axial direction; it is sufficient if a closed, annular lump of sealing mass is arranged in the gap.

An organic sealing masses with sufficient acid, water and temperature resistance, such as chemically setting sealing masses, often only set very slowly. Since the pipes to be sealed against each other must usually be moved into their final position after setting, however, the first and second pipes are fixed against each other before injecting the sealing mass, according to the invention.

This can take place, for example, by attaching a connecting element that covers the overlapping area of the pipe sections and stops the two pipe sections to be sealed together in such a way that they cannot move toward each other. This connecting element can consist of a pipe clamp, for example, i.e., of two annular elements which, spaced from each other, each surround the circumference of a pipe and which are joined together rigidly and without twist by clasps that extend axially over the overlapping area of the pipes.

In a particularly advantageous design, the connecting element is provided with a mineral coating at the point where it lies on the pipe sections.

A further possibility to secure the pipe sections to be sealed together against twisting while the mineral sealing mass is setting is to fix these pipe sections by punctually applying a quick setting adhesive. Examples of such a quick setting adhesive are, among others, ultraviolet adhesive, light-setting adhesive and two-component adhesive.

Both processes guarantee that the pipe sections to be sealed will not be moved toward each other while the mineral sealing mass is setting. Complete, secure sealing is thereby guaranteed by undisturbed setting of the sealing mass in the area of the overlapping pipe sections.

A pipe connection formed according to the invention, formed using a mineral sealing mass, is particularly suitable for use with pipes of ceramics, glass or fireclay, for example, because the thermal expansion factor of the mineral sealing mass is roughly in the same range as the expansion factor of ceramic materials. Tears or other leakages that occurred with other sealing systems during heating or cooling off of flue-gas pipes are thus eliminated.

A pipe connection formed according to the process of Patent claim 15 is sufficiently pressure-resistant to easily be used to seal exhaust gas pipes. It is also sufficiently resistant to acid, water and temperature that it can be used with excellent results to seal diminished cross-sections for chimney arrangements, for example.

In a preferred, improved form of construction, the pipe connection according to the invention is formed, in the case of vertically arranged pipes, by first inserting a mineral toroidal ring before inserting the mineral sealing mass into the gap, open at the top, between the two pipes to be sealed together. By inserting the mineral toroidal ring, a cavity is created on the side of the pipe connection facing the pipe interior. Condensates precipitating on the toroidal ring drip off into this cavity and can be fed back into the inside of the pipe system without directly attacking the mineral sealing. With this measure, the useful life of the seal is substantially increased. A mineral toroidal ring is preferably used because in this way, in the case of a vertical pipe arrangement, a defined cavity can be formed in the lower section of the gap. This cavity represents a constructive measure to prevent humidity from being carried by capillary forces into the mineral toroidal ring or the seal lying on top of it. In addition, the toroidal ring is absorbent and immediately absorbs excess humidity that can occur when the anorganic sealing mass sets, which then decisively accelerates the setting process. As described above, it can be inserted in the gap after joining the pipes, but it can also be mounted beforehand on one of the two meshing pipe ends for greater handiness.

The pipe connection according to the invention and the process to form this pipe connection can be used easily for all previously known materials used to produce the pipe sections. It is particularly suitable for glass, fireclay, ceramic materials whether glazed or not, and for metallic materials, particularly for stainless-steel pipes.

When using pipes of glass, a mineral spacer ring is preferably inserted between the pipe joints to avoid material damages.

BRIEF DESCRIPTION OF THE DRAWINGS

The pipe connection according to the invention is described in greater detail below with the example of a few preferred forms of construction shown in the drawings in which.

DETAILED DESCRIPTION

Figure 1:
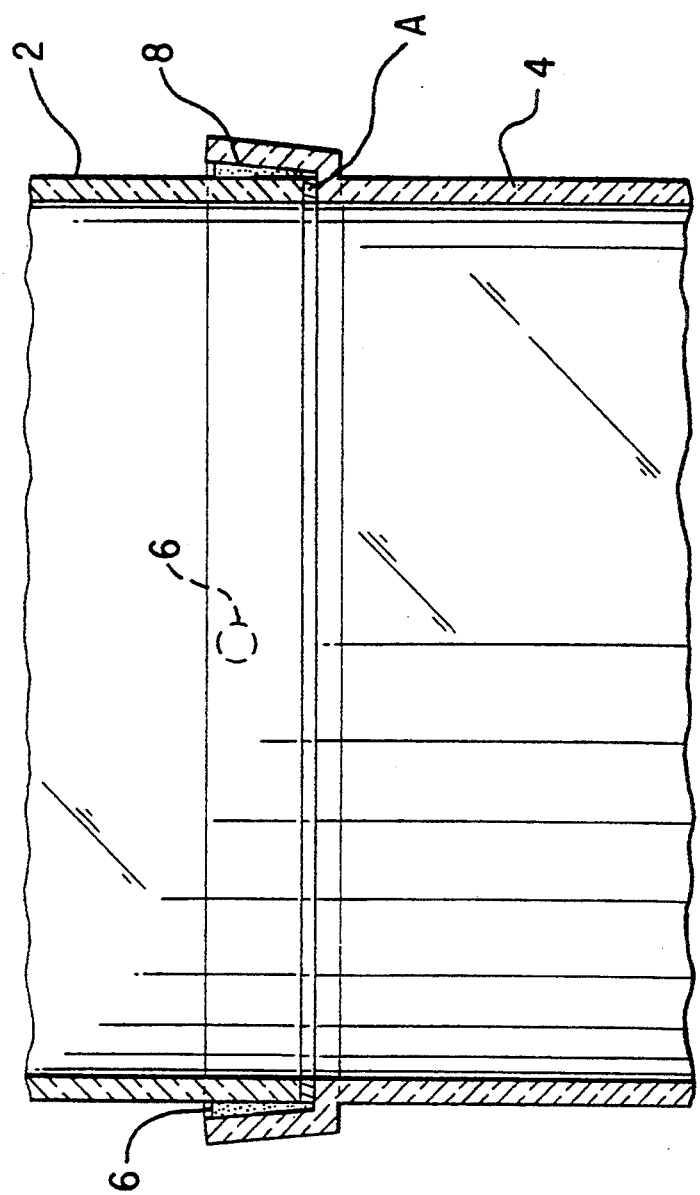
FIG. 1 a cross-section of a pipe system with pipes sealed together according to the invention.

FIG. 1 shows a cross-section of a pipe system in which a second pipe 4 of glass is inserted into a first pipe of glass 2 with enlarged end area (muff). The two pipes are fixed together by punctually applying an ultraviolet adhesive 6 that sets exceptionally quickly under the light of a UV lamp.

The pipe joints of the two pipes 2 and 4 are protected from damage during installation by inserting a spacer ring A of mineral material that does not have to have a sealing action. The spacer ring is fixed on the pipe 4 in the preferred form of construction. After fixing with UV adhesive, an anorganic sealing mass 8 is filled into the gap that results between the overlapping areas of the first and the second pipe. The sealing mass 8, as shown in FIG. 1, can completely fill the entire gap in axial direction, but it would be sufficient to fill only part of the gap with the sealing mass in order to attain the desired gas-tightness and resistance of the connection. Sealing materials that can be used include all sealing materials that are sufficiently resistant to temperature, acidity and humidity, in particular the kind previously used in chimney construction. Preferable sealing masses to be used are anorganic, chemically setting ones; particularly preferred are the familiar two-component, water glass based systems with a thermal expansion factor of approx. $3.3-12.10^{-6}\ K^{-1}$. But acid-resisting cements, already familiar in chimney construction, (e.g., HES acid-resisting cement from the Hoechst Co.) are also suitable as sealing mass.

The pipes 2, 4, pre-fixed in this manner and sealed and connected with a slow-setting, anorganic sealing mass 8, can then be brought into their final position, for example inside an already pre-faced chimney. Pre-fixing with UV adhesive 6 ensures that the already sealed pipe sections will no longer move toward each other and thereby impair the sealing action of the mineral sealing mass 8.

Figure 2:
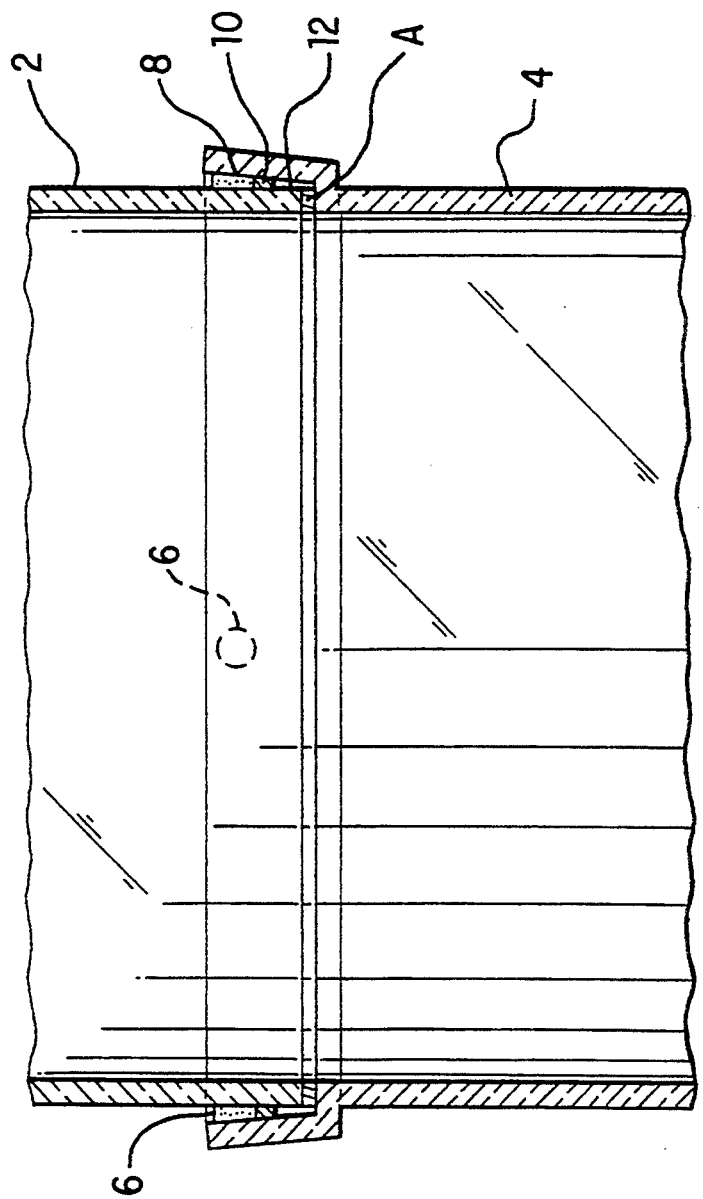
FIG. 2 a cross-section of a pipe system whose pipes were fixed beforehand using a quick setting adhesive.

FIG. 2 also shows a cross-section of a vertically arranged pipe system in which two pipes are sealed together. Identical reference numbers are used in FIG. 2 to designate the same elements with the same function as in FIG. 1, without repeating the explanation.

FIG. 2 shows a pipe connection in which, for improved removal of any occurring acid condensates, as occur particularly in the case of cooling flue-gases, the construction of the seal is supplemented by a device 10 onto which an precipitating condensate can drip. This sealing system is formed by inserting, after joining the pipes 2 and 4, a mineral toroidal seal 10 into the gap, open at the top, between the two pipes. Not only does this toroidal ring 10 cause improved dripping of condensates into the cavity 12 formed below the toroidal ring, it also allows better alignment of the glass pipe 2 in the muff of the pipe 4. After inserting the toroidal ring 10, the quick-setting UV adhesive 6 is punctually applied and after this adhesive sets, the anorganic sealing material 8 is applied onto the toroidal ring 10 into the gap between the pipes 2 and 4.

The arrangement of the mineral toroidal ring 10 in the gap between the pipe sections 2 and 4, and the gap itself, are measured in such a way that sufficient space remains to apply the anorganic sealing material 8, in such a way that the two pipes are securely joined and sealed together. The cavity 12, open toward the inside of the pipe, created by inserting the toroidal ring 10, is measured in such a way that precipitating condensate can drip off on the toroidal ring 10 and on the walls of the pipes 2 and 4 forming the cavity 12 and can drip back through the mineral spacer ring A into the inside of the pipe. The toroidal ring 10 thereby further prevents precipitating, acid condensates from attacking the mineral sealing material.

Figure 4:
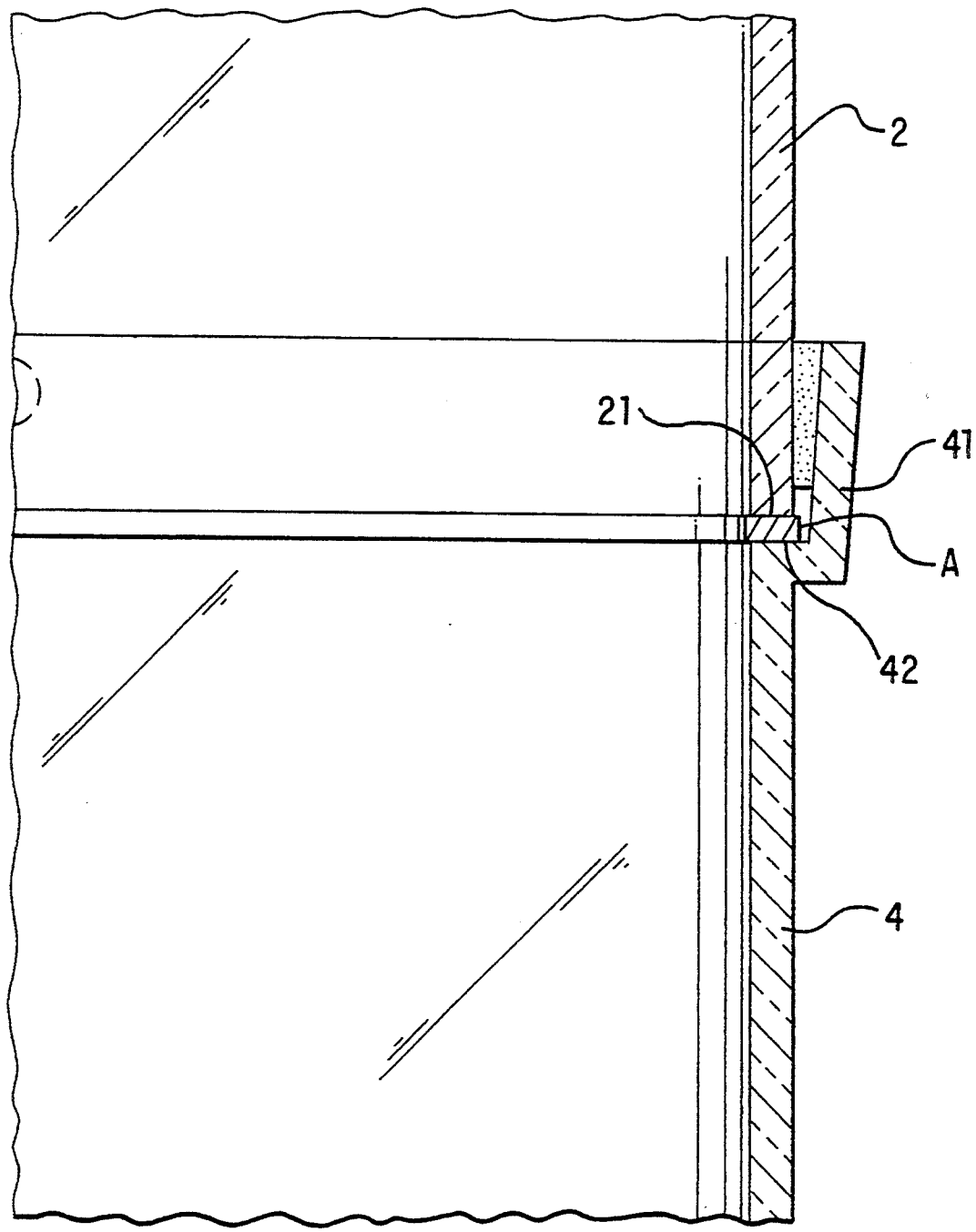
FIG. 4 is a cross-sectional detail view of the pipe system of FIG. 2.

FIG. 4 is a detail view of the pipe system of FIG. 2. As shown, the end portion of a first pipe 4 includes a muff 41 having an inside rim 42. The inside rim and the front portion 21 of a smooth end portion of the second pipe 2 form a joint therebetween. A spacer ring (A) made of mineral material is arranged in the gap at the joint.

Figure 3:
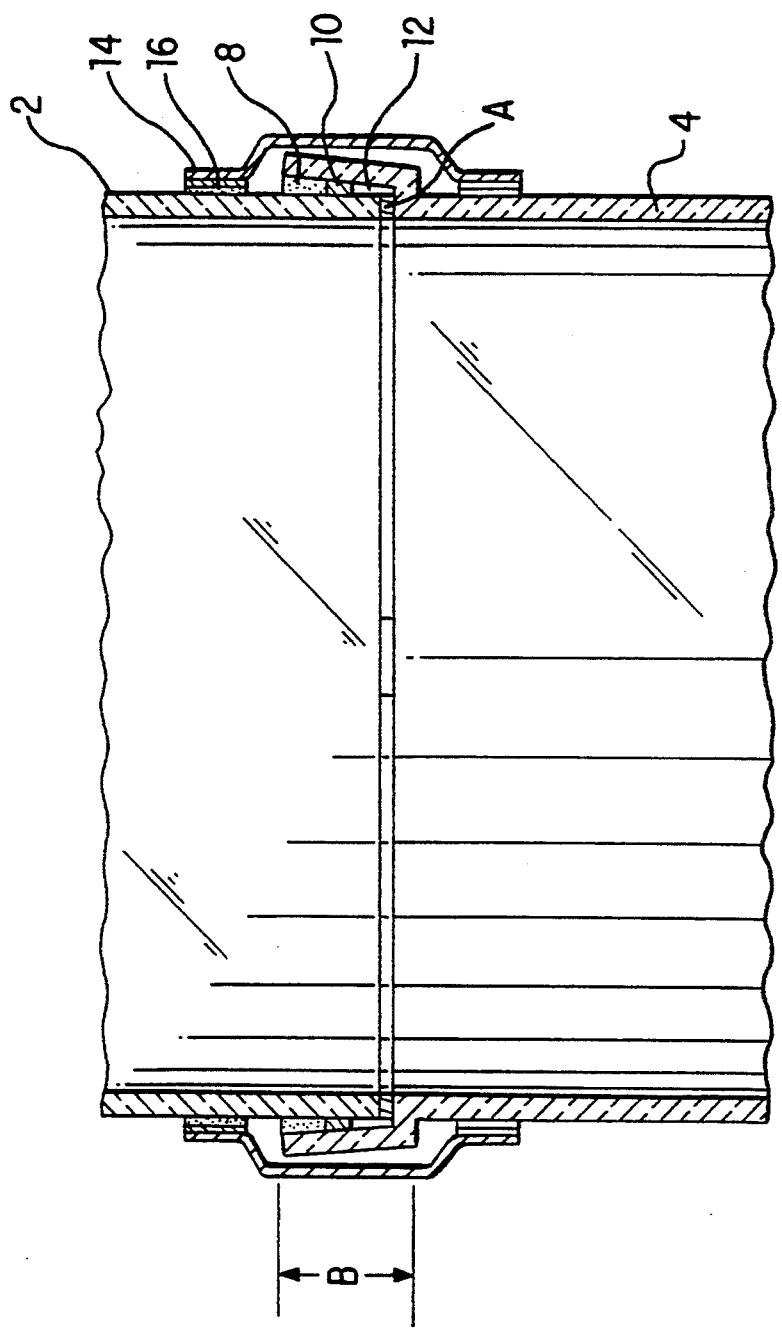
FIG. 3 a cross-section of a pipe system whose pipes were fixed by a connecting element before inserting the mineral sealing mass.

FIG. 3 also shows a cross-section through a pipe system. Insofar as the same reference numbers are used in FIG. 3 as in FIGS. 1 and 2, they designate the same elements with the same functions, without repeating their description.

Unlike FIGS. 1 and 2, FIG. 3 shows a form of construction of the present invention in which two glass pipes 2 and 4 arranged vertically over each other are secured against twisting and sliding, before the anorganic sealing material 8 is applied, by a connecting element 14, designed in this instance as pipe clamp. The pipe clamp 14 has, at the contact surfaces at which the pipe clamp lies on the pipe sections 2 and 4, a mineral coating 16 to prevent damage to the glass pipes. While the connecting element 14 completely surrounds the pipes 2 and 4 in the area of the mineral coating 16, in the overlapping area B of the two pipes this element 14 can consist of strips arranged in axial direction. This form of construction, in which the connecting elements 14 completely surrounding the circumference of the pipes 2 and 4 are only connected by strips extending axially, saves material and also facilitates the application of the anorganic sealing material.

The sealing system shown in FIG. 3 is mounted as follows: After joining the two pipes 2 and 4, the connecting element 14 is clamped around the two pipes 2 and 4 in such a way that they are fixed and unable to twist and slide. Subsequently, the mineral toroidal ring 10 is inserted into the gap between the two pipes 2 and 4. The sealing mass 8 is inserted on the toroidal ring 10. Pre-fixed in this way and provided with toroidal ring and sealing mass, the pre-assembled pipes are then brought into their final position.

The form of construction, described in FIGS. 2 and 3, of the sealing system with toroidal ring ensures perfect dripping back of the condensate into the inside of the pipe. In the case of non-vertical pipes, other constructive measures (slanting) must be taken, if necessary, to secure the return of the condensates.

What is claimed is:
1. A pipe connection for flue-gas pipes comprising:
a first pipe having an end portion;
a second pipe having a smooth end portion, said end portion of said first pipe overlapping said smooth end of said second pipe;
a gap formed from the overlap of said first pipe and said second pipe, said gap including an annular region and extending in an axial direction; and
an anorganic sealing mass filling said gap, partially in said axial direction and completely in said annular region;
wherein said first pipe and said second pipe are fixed together by fixing means;
wherein said first pipe and said second pipe are made of glass; and
wherein said end portion of said first pipe includes a muff having an inside rim, said inside rim and a front portion of said smooth end portion of said second pipe forming a joint therebetween, and wherein a spacer ring made of mineral material is arranged in said gap at said joint.

2. A pipe connection according to claim 1, wherein said end portion of said first pipe is formed as a coupling sleeve.

3. A pipe connection according to claim 1, wherein said fixing means consists of a connecting element covering the overlapping pipe area.

4. A pipe connection according to claim 3, wherein said connecting element is a pipe clamp provided with perforations for filling said gap with said anorganic sealing mass.

5. A pipe connection according to claim 3, wherein said connecting element has areas that contact said first pipe and said second pipe and wherein said areas are provided with a coating of mineral material.

6. A pipe connection according to claim 1, wherein said fixing means consist of spots of quick-setting adhesive applied in said gap.

7. A pipe connection according to claim 6, wherein said quick-setting adhesive hardens when subject to ultraviolet radiation.

8. A pipe connection according to claim 1, further comprising a device provided in said gap so as to form a cavity defined by the device, an inner surface of said first pipe and an outer surface of said second pipe, said device providing a surface whereby condensation drips into the interior of the pipe connection.

9. A pipe connection according to claim 8, wherein said device consists of a mineral toroidal ring inserted into said gap.

10. A pipe connection according to claim 1, wherein said sealing mass is chemically setting.

11. A pipe connection according to claim 1, wherein said sealing mass is a mineral sealing mass having a thermal expansion factor in the range of 3.3 to $12 \times 10^{-6} K^{-1}$.

12. A pipe connection according to claim 1 wherein said anorganic mass forms a hardened sealing ring which at least partially fills said gap in the axial direction, and wherein said first pipe and said second pipe are fixedly positioned relative to each other.

13. A pipe connection for flue-gas pipes comprising:
a first pipe having an end portion;

a second pipe having a smooth end portion, said end portion of said first pipe overlapping said smooth end of said second pipe;

a gap formed from the overlap of said first pipe and said second pipe, said gap including an annular region and extending in an axial direction; and an anorganic sealing mass filling said gap, partially in said axial direction and completely in said annular region;

wherein said first pipe and said second pipe are fixed together by fixing means; and wherein said sealing mass is a chemically setting mineral sealing mass having a thermal expansion factor in the range of 3.3 to $12 \times 10^{-6} K^{-1}$.

14. A pipe connection according to claim 13, wherein said end portion of said first pipe is formed as a coupling sleeve.

15. A pipe connection according to claim 13, wherein said fixing means consists of a connecting element covering the overlapping pipe area.

16. A pipe connection according to claim 13, wherein said fixing means consist of spots of quick-setting adhesive applied in said gap.

17. A pipe connection for flue-gas pipes comprising:
a first pipe having an end portion;
a second pipe having a smooth end portion, said end portion of said first pipe overlapping said smooth end of said second pipe;

a gap formed from the overlap of said first pipe and said second pipe, said gap including an annular region and extending in an axial direction; and an anorganic sealing mass filling said gap, partially in said axial direction and completely in said annular region;

wherein said first pipe and said second pipe are fixed together by fixing means; and further comprising a device provided in said gap so as to form a cavity defined by the device, an inner surface of said first pipe and an outer surface of said second pipe, said device providing a surface whereby condensation drips into the interior of the pipe connection.

18. A pipe connection according to claim 17, wherein said first pipe and said second pipe are made of ceramic material.

19. A pipe connection according to claim 18, wherein said ceramic material is glazed.

20. A pipe connection according to claim 18, wherein said ceramic material is unglazed.

21. A pipe connection according to claim 17, wherein said first pipe and said second pipe are made of a metallic material.

22. A pipe connection according to claim 21, wherein said metallic material is stainless steel.

23. A pipe connection according to claim 17, wherein said device consists of a mineral toroidal ring inserted into said gap.

24. A pipe connection for flue-gas pipes comprising:
a first pipe having an end portion;
a second pipe having a smooth end portion, said end portion of said first pipe overlapping said smooth end of said second pipe;

a gap formed from the overlap of said first pipe and said second pipe, said gap including an annular region and extending in an axial direction; and an anorganic sealing mass filling said gap, partially in said axial direction and completely in said annular region;

wherein said first pipe and said second pipe are fixed together by fixing means; and wherein said fixing means consist of spots of quick-setting adhesive applied in said gap.

25. A pipe connection according to claim 24, wherein said end portion of said first pipe is formed as a coupling sleeve.

26. A pipe connection according to claim 24, wherein said quick-setting adhesive hardens when subjected to ultraviolet radiation.

* * * * *